US012783414B2

(12) United States Patent
Tann et al.

(10) Patent No.: US 12,783,414 B2
(45) Date of Patent: Nov. 3, 2026

(54) SYSTEMS AND METHODS FOR MANAGING MULTI-TIER KEY-VALUE CACHING FOR GENERATIVE AI MODELS

(71) Applicant: Microsoft Technology Licensing, LLC, Redmond, WA (US)

(72) Inventors: Hokchhay Tann, North Reading, MA (US); Hima Bindu Damecharla, San Diego, CA (US); Preyas Janak Shah, Odessa, FL (US); Matthew Mattina, Boylston, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/186,798

(22) Filed: Apr. 23, 2025

(65) Prior Publication Data

US 2026/0339841 A1 Oct. 29, 2026

(51) Int. Cl.
*G06F 12/0802* (2016.01)

(52) U.S. Cl.
CPC ...... *G06F 12/0802* (2013.01); *G06F 2212/60* (2013.01)

(58) Field of Classification Search
CPC ......................... G06F 12/0802; G06F 2212/60
See application file for complete search history.

(56) References Cited

U.S. PATENT DOCUMENTS

| | | | | |
|---|---|---|---|---|
| 12,346,252 | B1 * | 7/2025 | Dhakal | G06F 12/0802 |
| 2020/0302019 | A1 | 9/2020 | Hall et al. | |
| 2024/0386038 | A1 | 11/2024 | Amershi | |
| 2024/0411658 | A1 | 12/2024 | Ramanujan | |
| 2025/0036876 | A1 | 1/2025 | Kozlov | |
| 2025/0061316 | A1 | 2/2025 | Gobriel | |
| 2025/0076059 | A1 | 3/2025 | Yankov | |
| 2026/0105005 | A1 * | 4/2026 | Zhang | G06F 12/0802 |

OTHER PUBLICATIONS

Kwon, et al., "Effcient Memory Management for Large Language Model Serving with PagedAttention", arXiv:2309.06180v1, Sep. 12, 2023, 16 pages.

(Continued)

*Primary Examiner* — Aracelis Ruiz
(74) *Attorney, Agent, or Firm* — Ranjeev Singh; Singh Law, PLLC

(57) ABSTRACT

Systems and methods for managing multi-tier key-value (KV) caching for a generative artificial intelligence (AI) model are described. A system includes a lower tier memory, a higher tier memory, and a KV cache manager to: (1) determine whether a key-value (KV) cache corresponding to a user associated with a session exists in the lower tier memory, and (2) if the KV cache, or a portion thereof, does not exist in the lower tier memory, upon determining that at least a portion of the KV cache exists in the higher tier memory, load at least the portion of the KV cache into the lower tier memory. The system includes a KV cache engine to execute: (1) an extended prefill phase to generate keys and values for extending the KV cache in the lower tier memory, and (2) a decode phase to generate output tokens until a stopping criteria is met.

20 Claims, 11 Drawing Sheets

(56) References Cited

OTHER PUBLICATIONS

Pan, et al., "InstInfer: In-Storage Attention Offloading for Cost-Effective Long-Context LLM Inference", arXiv:2409.04992v1, Sep. 8, 2024, 15 pages.
Prabhu, et al., "vAttention: Dynamic Memory Management for Serving LLMs without PagedAttention", arXiv preprint arXiv:2405.04437v2, Jul. 12, 2024, pp. 1-16.
Vaswani, et al., "Attention is All You Need", In Repository of: arXiv:1706.03762v7, Aug. 2, 2023, pp. 1-15.
Xu, et al., "BlueCache: A Scalable Distributed Flash-based Key-value Store", Proceedings of the VLDB Endowment, vol. 10, Issue. 4, Dec. 2016, pp. 301-312.
Xiong, et al., "LayerKV: Optimizing Large Language Model Serving with Layer-wise KV Cache Management", arXiv:2410.00428v1, Oct. 1, 2024, 11 pages.
Gao, et al., "AttentionStore: Cost-effective Attention Reuse across Multi-turn Conversations in Large Language Model Serving", In Repository of arXiv:2403.19708v1, Mar. 23, 2024, 17 pages.
International Search Report and Written Opinion received for PCT Application No. PCT/US2026/014416, mailed on May 13, 2026, 13 pages.
Liu, et al., "CacheGen: Fast Context Loading for Language Model Applications via KV Cache Streaming", In Repository of arXiv:2310.07240v2, Mar. 13, 2024, 20 pages.
Yu, et al., "Stateful Large Language Model Serving with Pensieve", In Repository of arXiv:2312.05516v2, May 28, 2024, 15 pages.

* cited by examiner

200

300

600

700

900

1100

SYSTEMS AND METHODS FOR MANAGING MULTI-TIER KEY-VALUE CACHING FOR GENERATIVE AI MODELS

BACKGROUND

Generative AI models, including large language models (LLMs), are enabling new applications at scale, such as programming assistants, chatbots, copilots, and other generative AI-applications. Hosting such generative AI models-based applications requires a large number of hardware accelerators and memory. Many generative AI models use transformers for autoregressive self-attention. Such generative AI models generate tokens, usually one at a time, based on the input prompt and any previously generated tokens. For each input request, this expensive process is repeated until the model outputs a termination token or otherwise terminates the process.

In general, in a typical user interaction with a generative AI model, the model first needs to understand the context or the user's inputs before it can generate a response. This is done by processing the user's inputs and converting it into a key-value token cache (KV cache). When generating a response, the model repeatedly accesses the KV cache and updates it with newly generated tokens. For each new token that is generated, the model needs to access the entire KV cache and append any new KV cache data from the newly generated token.

There are several issues with the use of the KV cache in the context of generative AI models. First, the process used for generating the KV cache from user's inputs is computationally expensive. Second, the computational complexity can lead to a high amount of latency before the model can start generating a response to the users. The higher latency can manifest itself as longer times to outputting a first new token. Third, the KV cache size increases with context length, using significant space in the primary memory (e.g., high-bandwidth memory (HBM)). Accordingly, there is a need for continued improvement to KV caching in the context of generative AI models.

SUMMARY

In one example, the present disclosure relates to a system for managing multi-tier key-value (KV) caching for a generative artificial intelligence (AI) model. The system may include at least one lower tier memory associated with the system. The system may further include at least one higher tier memory associated with the system. The system may further include a KV cache manager to: (1) in response to resumption of a session, determine whether a key-value (KV) cache corresponding to a user associated with the session exists in the at least one lower tier memory associated with the system, and (2) if the KV cache, or a portion thereof, does not exist in the at least one lower tier memory, upon determining that at least a portion of the KV cache exists in the at least one higher tier memory associated with the system, load at least the portion of the KV cache into the at least one lower tier memory.

The system may further include a KV cache manager to: (1) in response to resumption of a session, determine whether a key-value (KV) cache corresponding to a user associated with the session exists in the at least one lower tier memory associated with the system, and (2) if the KV cache does not exist in the at least one lower tier memory, upon determining that at least a portion of the KV cache exists in the at least one higher tier memory associated with the system, load at least the portion of the KV cache into the at least one lower tier memory.

In another example, the present disclosure relates to a method for managing multi-tier key-value (KV) caching for a generative artificial intelligence (AI) model served by a system. The method may include in response to resumption of a session, determining whether a key-value (KV) cache corresponding to a user associated with the session exists in at least one lower tier memory associated with the system. The method may further include, if the KV cache, or a portion thereof, does not exist in the at least one lower tier memory, upon determining that at least a portion of the KV cache exists in at least one higher tier memory associated with the system, loading at least the portion of the KV cache into the at least one lower tier memory associated with the system.

The method may further include, if the KV cache does not exist in any higher tier memory, including the at least one higher tier memory, associated with the system, executing: (1) an extended prefill phase to generate keys and values for extending the KV cache, and (2) a decode phase to generate output tokens until a stopping criteria is met.

In another example, the present disclosure relates to a system for managing multi-tier key-value (KV) caching for a generative artificial intelligence (AI) model. The system may include at least one hardware accelerator. The system may further include a first tier memory associated with the at least one hardware accelerator. The system may further include a second tier memory associated with the at least one hardware accelerator. The system may further include a third tier memory associated with the at least one hardware accelerator.

The system may further include a KV cache manager to: (1) in response to resumption of a session, determine whether a key-value (KV) cache corresponding to a user associated with the session exists in the first tier memory associated with the at least one hardware accelerator, and (2) if the KV cache, or a portion thereof, does not exist in the first tier memory, upon determining whether at least a portion of the KV cache exists in at least one of the second tier memory or the third tier memory associated with the at least one hardware accelerator, load at least the portion of the KV cache into the first tier memory associated with the at least one hardware accelerator. The system may further include a KV cache engine to, if the KV cache does not exist in the first tier memory, the second tier memory, or the third tier memory, execute: (1) an extended prefill phase to generate keys and values for extending the KV cache in the at least one lower tier memory, and (2) a decode phase to generate output tokens until a stopping criteria is met.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
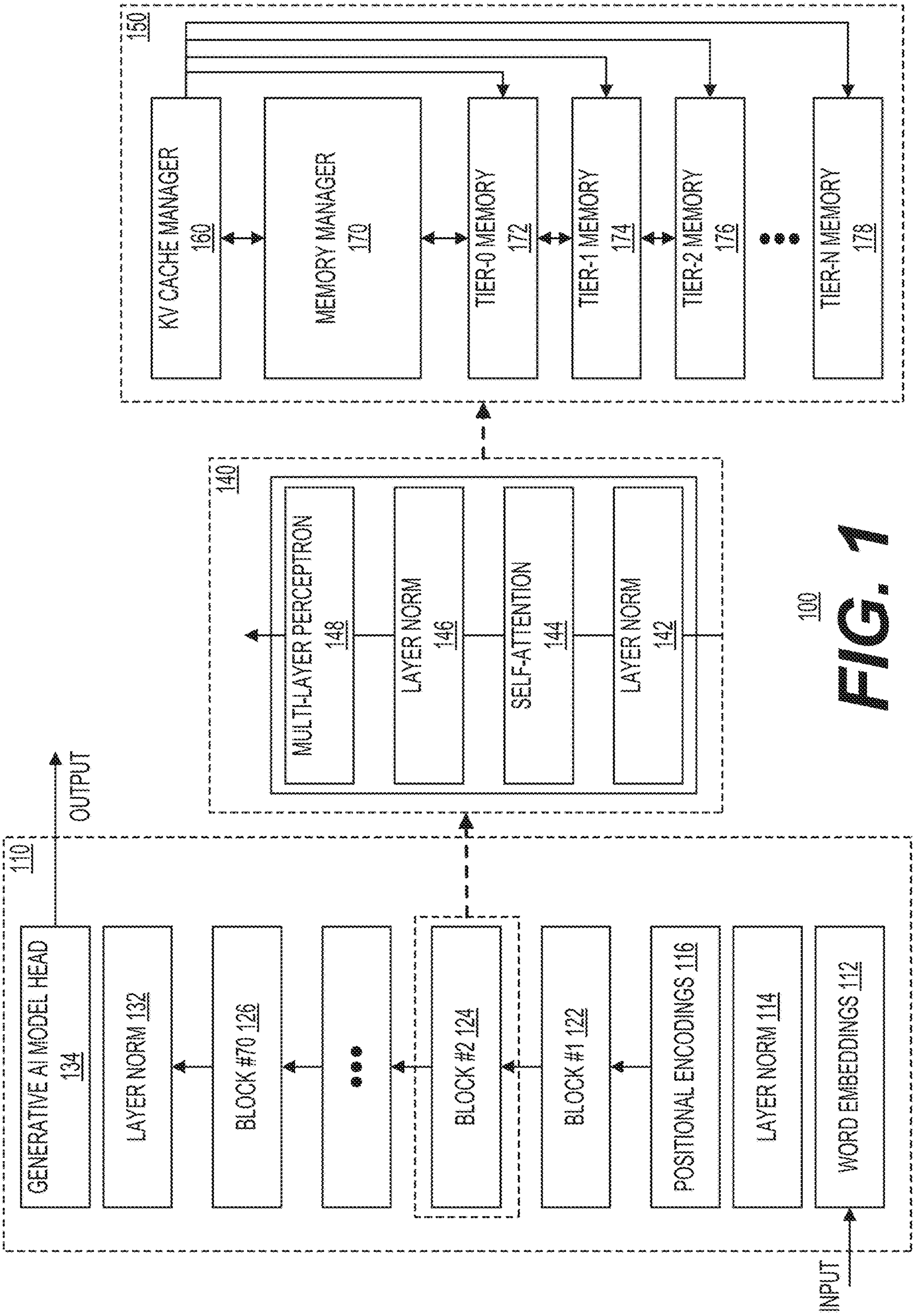
FIG. 1 shows a system for implementing multi-tier key-value caching for generative AI models in accordance with one example.

Examples disclosed in the present description relate to multi-tier key-value (KV) caching for generative AI models. Generative AI models, including large language models (LLMs), are enabling new applications at scale, such as programming assistants, chatbots, copilots, and other generative AI-applications. Hosting and serving such generative AI models-based applications requires a large number of hardware accelerators and memory. Many generative AI models use transformers for autoregressive self-attention. Such generative AI models generate tokens, usually one at a time, based on the input prompt and any previously generated tokens. For each input request, this expensive process is repeated until the model outputs a termination token or otherwise terminates the process.

In general, in a typical user interaction with a generative AI model, the model first needs to understand the context or the user's inputs before it can generate a response. This is done by processing the user's inputs and converting it into a key-value token cache (KV cache). When generating a response, the model repeatedly accesses the KV cache and updates it with newly generated tokens. For each new token that is generated, the model needs to access the entire KV cache and append any new KV cache data from the newly generated token.

There are several issues with the use of the KV cache in the context of generative AI models. First, the process used for generating the KV cache from users' inputs is computationally expensive. Second, the computational complexity can lead to a high amount of latency before the model can start generating a response to the users. The higher latency can manifest itself as longer times to outputting the first new token. Third, the KV cache size increases with context length, using significant space in primary memory (e.g., high-bandwidth memory (HBM)).

When serving multiple users, some users may become inactive for certain periods of time due to various reasons. When this happens, it would be advantageous to free up expensive memory space for active sessions to better utilize the system's compute resources. This is because without an additional tier of memory, the inactive user's KV cache blocks will be evicted and the contents associated with the user's session will be lost. Accordingly, if and when the previously inactive users come back online, one would have to reprocess all their previous sessions into the KV cache before one can start generating a response to them. Such reprocessing, including computation of KV cache values, can increase the time to a first new token significantly.

The examples described herein address these various issues by provisioning multi-tiered KV caching for generative AI models. Example systems described herein provision various tiers of memory for KV caching, including a lower tier of memory and one or more higher tiers of memory. By off-loading the inactive user's KV cache from a lower tier memory onto a higher tier memory, the time to first new token can be significantly reduced when the user comes back online. Consistent with the examples of the present disclosure, a KV cache manager has access to both a lower tier memory and several higher tier memories. As an example, the KV cache manager can access a combination of a lower tier memory (e.g., high bandwidth memory (HBM) that is local to an AI accelerator) and several higher tier memories, including pooled memory (e.g., an allocated portion of a pooled memory). As an example, the KV cache manager may be allocated pooled memory exposed by a pooled memory system, which then may be made accessible to the KV cache manager. The pooled memory relates to memory that includes any physical memory that is shared by multiple AI accelerators. The KV cache may be evicted from the lower tier memory and then off-loaded onto the higher tier memory. Any suitable eviction algorithm, including the least recently used (LRU) or the least frequently used (LFU) can be deployed for selecting which KV cache to evict from the lower tier memory. In this arrangement, the lower tier memory (e.g., the local HBM) may be implemented using expensive memory and the higher tier memory (e.g., the pooled memory) may be implemented using cheaper memory. As another example, the expensive memory may correspond to double data rate (DDR) dynamic random access memory (DRAM) that operates at a higher data rate (e.g., DDR2 DRAM, DDR3 DRAM, DDR4 DRAM, or DDR5 DRAM) and the cheaper memory may correspond to DRAM that operates at a lower data rate (e.g., DRAM or DDR DRAM). Other cost differences may be a function of the reliability or other differences in quality associated with the lower tier memory versus the higher tier memory. As used herein the term "lower tier memory" and "higher tier memory" are to be viewed in relative terms. Thus, lower tier memory includes any memory that is used for storing the KV cache values that when evicted from the lower tier memory are off-loaded to a higher tier memory. Multiple tiers of memory allow the KV cache manager to keep the time to the first new token low while at the same time ensuring other objectives, including keeping the cost of the system as a whole low.

FIG. 1 shows a system 100 for implementing multi-tiered key-value caching for generative AI models in accordance with one example. System 100 shows an example illustration of the multi-tiered key-value caching for generative AI models, including LLMs. System 100 includes a pre-trained generative AI model 110 that processes an input to generate model output. Generative AI model 110 is based on the BLOOM model architecture and is selected to explain the implementation of multi-tiered key-value caching for generative AI models. In other words, multi-tiered KV caching described herein can be used with other types of models, as well, including multi-modal models. Generative AI model 110 includes several layers, including word embeddings 112, layer norm 114, and positional encodings 116. These layers are present in generative AI models used as large language models, and one or more of these layers may not be present in a different context. Additionally, generative AI model 110 can include multiple transformer blocks, including block #1 122, block #2 124, and block #70 126. Each transformer block layer includes several other layers, including layers 140. Layers 140 include a layer norm 142, a self-attention 144, another layer norm 146, and a multi-layer perceptron 148. The output of these blocks is provided to additional layers, including layer norm 132 and generative AI model head 134, which provides the output of the generative AI model 110. To predict the next token in a sentence using generative AI model 110, the input tokens are passed through each of the seventy transformer blocks shown in FIG. 1.

With continued reference to FIG. 1, during auto-regressive inferencing, generative AI model 110 can speed up processing by using a KV cache as part of the prefilling and the decoding stages. Multi-tiered KV cache memory system 150 can be used to provide at least some aspects of the KV cache implementation. In this example, multi-tiered KV cache memory system 150 includes a KV cache manager 160 and a memory manager 170. KV cache manager 160 and memory manager 170 are further coupled with a TIER-0 memory 172, a TIER-1 memory 1174, a TIER-2 memory 176, and a TIER-N memory 178. During the prefiling phase of auto-regressive inferencing, generative AI model 110 can process all of the tokens of the input prompt in parallel to generate a first predicted token. The first predicted token can be appended to the existing input prompt sequence (also referred to as context herein). Moreover, because the full extent of the input is known at this stage the matrix-operations for computing the tokens can be parallelized. In the decoding phase, generative AI model 110 predicts one new output token at a time based on the input from the prefilling phase. Self-attention can be used to create the KV cache and the tokens. The generated KV values and the generated token(s) can be stored as part of the multi-tiered KV cache memory system 150.

Although FIG. 1 describes a generative AI model 110, which is configured to process text in the form of a large language model, generative AI model 110 can be pre-trained according to other types of inputs (e.g., images, videos, or other types of content). It will be appreciated that the input to the generative AI model 110 and the output of generative AI model 110 may each include any of a variety of content types, including, but not limited to, text output, image output, audio output, video output, programmatic output, and/or binary output, among other examples. Generative AI model 110 may be provided or otherwise used according to any of a variety of different system environments and paradigms. As an example, generative AI model 110 may be local to a computing device or may be accessed remotely via a machine learning service (e.g., a server in a datacenter). In other examples, aspects of generative AI model 110 may be distributed across multiple computing devices. In some instances, generative AI model 110 is accessible via an application programming interface (API), as may be provided by an operating system of the computing device and/or by the machine learning service, among other examples. The physical implementation of the components within system 100 may include diverse components, including various types of computing devices or resources and memory systems, including cache memories closely integrated with the processors, DRAMs (e.g., LPDDR memory), high-bandwidth memory (HBM) devices, flash-memory devices, or other memory systems. Each computing resource may be implemented using one or more of graphics processing units (GPUs), computer processing units (CPUs), or field programmable gate arrays (FPGAs). Application Specific Integrated Circuits (ASICs), Erasable and/or Complex programmable logic devices (PLDs), Programmable Array Logic (PAL) devices, or Generic Array Logic (GAL) devices may also be used to implement the computing resources.

Figure 2:
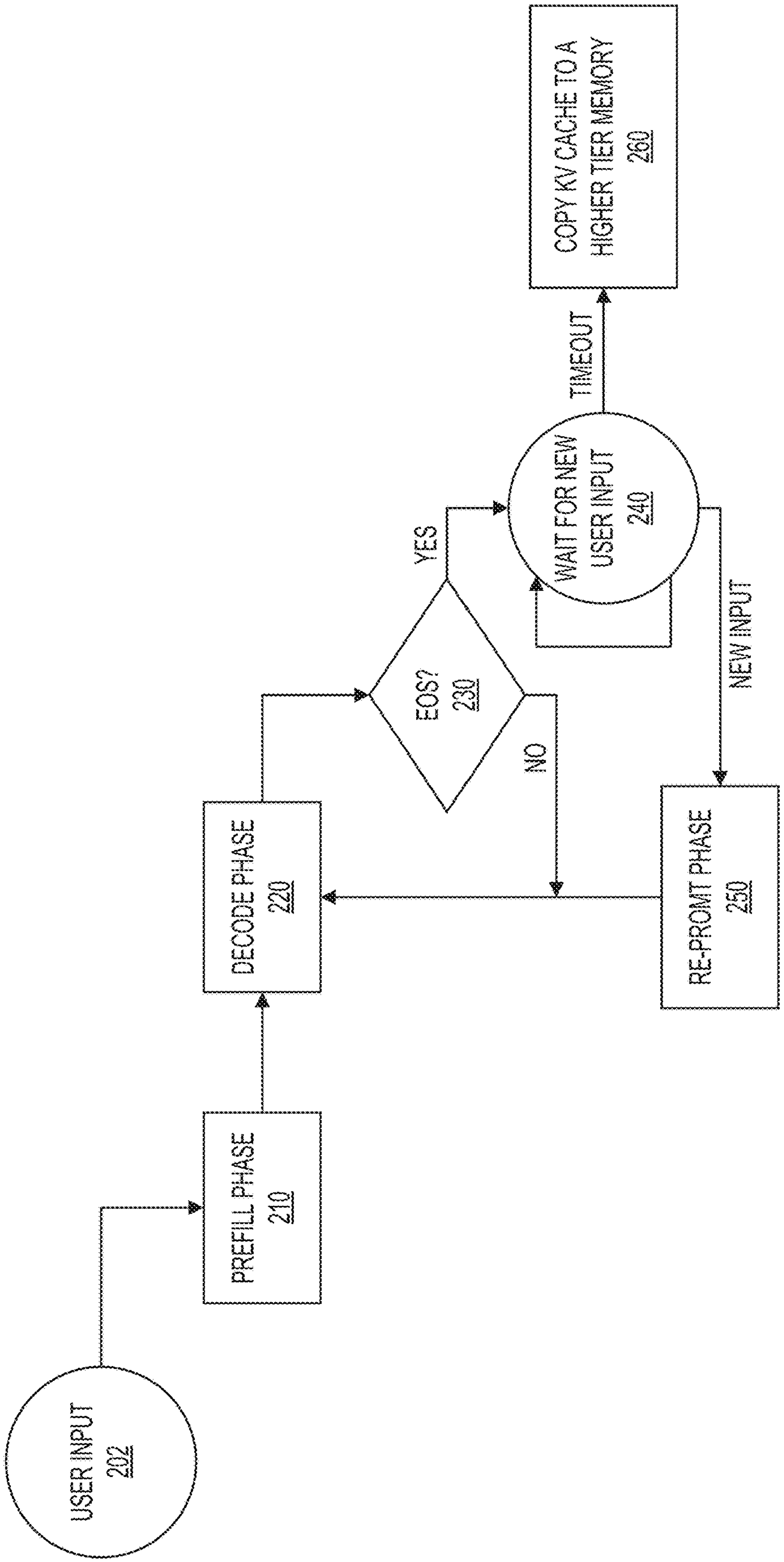
FIG. 2 shows a flow diagram of a new session to explain multi-tier KV caching in accordance with one example.

FIG. 2 shows a flow diagram 200 of a new session to explain multi-tier KV caching in accordance with one example. Flow diagram 200 shows user input 202 being received by a generative AI model (e.g., generative AI model 110 of FIG. 1). In the case of a generative text model (e.g., a chat agent), the user input 202 can include a text prompt. In other cases, user input 202 may include images or other types of data for processing by the generative AI model. User input 202 is processed as part of a prefill phase 210. During prefill phase 210, the generative AI model processes the input prompt and creates the KV cache and a first "new" token. This process involves computing the probability of the first new token, the generation of key vectors and value vectors. Each new token depends on all of the previous tokens. Moreover, because the full extent of the input is known at this stage the matrix-operations for computing the tokens can be parallelized. As noted earlier, self-attention can be used to create the values for storage as part of the KV cache and the tokens. The generated KV values and the generated token(s) can be stored in the lowest tier memory (e.g., the HBM associated with an accelerator, the GPU memory, the BRAM of an FPGA, or the L1 cache memory associated with a CPU) associated with the KV cache for the generative AI model. As an example, assuming the KV cache can be stored in a primary memory and a secondary memory, then during prefill phase 210, the KV cache is stored in the primary memory with the information, such as the user ID, the session ID, and other metadata.

The KV values and the token(s) are processed in the decode phase 220 in this phase, which is an autoregressive generation phase. In the decode phase, the generative AI model generates output tokens autoregressively one at a time, until a stopping criteria is met. The previously generated KV cache is used and any new key vectors and value vectors are generated. Each sequential output token needs to know all the previous iterations' output states (keys and values). Typically, this is a matrix-vector operation. Any number of different types of autoregressive generation algorithms can be used as part of decode phase 220. As an example, parallel decoding algorithms, beam search algorithms, and other types of decoding algorithms can be used. The decode phase 220 ends upon the occurrence of one of two conditions. First, the generative AI model can impose a maximum sequence length for processing, and when that maximum sequence length is reached, the decoding process is terminated. Alternatively, the generative AI model can indicate an end of sentence (EOS) (checked at stage 230) once the generative AI model has completed its response to the prompt. The inferencing service, associated with the generative AI model, can also indicate the EOS in response to a user prematurely indicating a stop (e.g., via a user interface) before the generative AI model has completed its response. If additional processing of tokens needs to take place (as a result of a NO at stage 230), then the flow returns back to decode phase 220. If, however, the end of sentence has been indicated or the maximum sequence length has been reached, then the generative AI model waits for new user input as part of wait for new user input 240 stage. If any new input has been received, then the generative AI model enters the re-prompt phase 250. During this phase, additional KV values are generated along with any new tokens, which are once again stored in the lower tier memory associated with the KV cache. As an example, if the HBM is the lower tier memory, then the KV cache is extended within the HBM, as long as there is still sufficient room in the HBM to extend the KV cache.

With continued reference to FIG. 2, if no additional user input is received, a timeout occurs, and at this time it is assumed that the new session has been completed. To save recompute time for any additional new tokens that could be generated during a resumed chat session, as part of stage 260, the KV values and the tokens are copied to a higher tier memory. As explained later, the evicted KV values and tokens can be off-loaded to a higher tier memory (e.g., a lower cost and a lower bandwidth memory). Additional details concerning the off-loading process are provided later. Although FIG. 2 shows flow diagram 200 as having a certain number of stages and phases, the generative AI model could process the user input using additional or fewer stages and phases.

Figure 3:
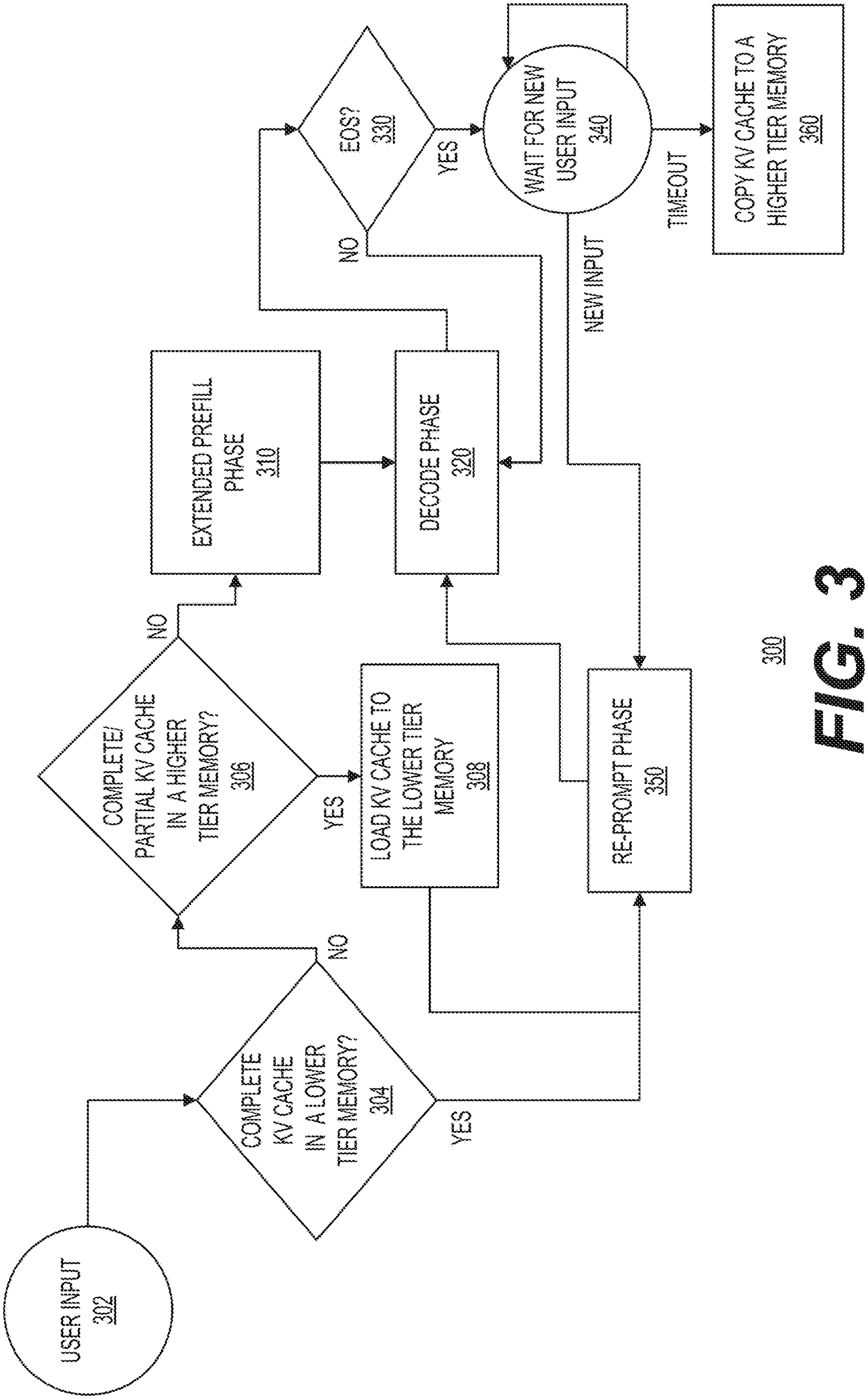
FIG. 3 shows a flow diagram of a resumed session to explain multi-tier KV caching in accordance with one example.

FIG. 3 shows a flow diagram 300 of a resumed session to explain multi-tier KV caching in accordance with one example. As part of the resumed chat session, flow diagram 300 shows additional user input 302 after an initial prompt has already been processed. Upon receiving user input 302, in stage 304, KV cache manager (or a similar component) determines whether the complete KV cache is in a lower tier memory (e.g., the HBM associated with the accelerator). If the answer is no, then, in stage 306, the KV cache manager determines whether the complete/partial KV cache is in a higher tier memory (e.g., the higher tier memory than the HBM associated with the accelerator). If the answer is yes, then in stage 308, KV cache is loaded into the lower tier memory (e.g., the HBM associated with the accelerator) Next, once the complete KV cache is in the lower tier memory, the flow proceeds to the re-prompt phase 350 during which the existing KV cache values is extended in a similar fashion as described earlier. Advantageously, because system 100 shown in FIG. 1 allows for a multi-tier memory, the time to first new token can be substantially lowered. This is because during the extended prefill phase 310 one is not required to compute all of the KV cache values again; instead, the complete/partial KV cache stored in a higher tier memory can be retrieved and used.

With continued reference to FIG. 3, if no KV cache (complete or partial) is present even in the higher tier memory, then the flow proceeds to the extended prefill phase 310. During the extended prefill phase 310, the generative AI model processes the input prompt and creates the KV cache and additional tokens. Each new token depends on all the previous tokens. Moreover, because the full extent of the input is known at this stage the matrix-operations for computing the tokens can be parallelized. As noted earlier, self-attention can be used to create the KV cache and the tokens. The generated KV values and the generated token(s) can be stored in the lower tier memory (e.g., the HBM associated with the accelerator, the GPU memory, the BRAM of an F PGA, or the L1 memory associated with a CPU) associated with the KV cache for the generative AI model. As an example, assuming the KV cache can be stored in a primary memory and a secondary memory, then during the extended prefill phase 310, the KV cache is stored in the primary memory with the information, such as the user ID, the session ID, and other metadata.

The KV values and the token(s) are processed in the decode phase 320 using a decoding algorithm. As noted earlier, in the decode phase 320 the generative AI model generates output tokens autoregressively one at a time, until a stopping criteria is met. Each sequential output token needs to know all the previous iterations' output states (keys and values). Any number of different types of decoding algorithms can be used as part of decode phase 320. As an example, parallel decoding algorithms, beam search algorithms, and other types of decoding algorithms can be used. The decode phase 320 ends upon the occurrence of one of two conditions. First, the generative AI model can impose a maximum sequence length for processing, and when that maximum sequence length is reached, the decoding process is terminated. Alternatively, the generative AI model can indicate an end of sentence (EOS) (checked at stage 330) once the generative AI model has completed its response to the prompt. The inferencing service, associated with the generative AI model, can also indicate the EOS in response to a user prematurely indicating a stop (e.g., via a user interface) before the generative AI model has completed its response. If additional processing of tokens needs to take place (as a result of a NO at stage 330), then the flow returns back to decode phase 320. If, however, the end of sentence has been indicated or the maximum sequence length has been reached, then the generative AI model waits for new user input as part of wait for new user input 340 stage. If any new input has been received, then the generative AI model enters the re-prompt phase 350. During this phase, additional KV values are generated along with any new tokens, which are once again stored in the top tier memory associated with the KV cache.

Still referring to FIG. 3, if no additional user input is received, a timeout occurs, and at this time it is assumed that the new session has been completed. To save recompute time for any additional new tokens that could be generated during a resumed chat session, the KV values and the tokens are copied to a higher tier memory as shown in stage 360 of flow diagram 300. As explained later, the evicted KV values and tokens can be off-loaded to a lower bandwidth (and less expensive) memory. Although FIG. 3 shows flow diagram 300 as having a certain number of stages and phases, the generative AI model can process the user input using additional or fewer stages and phases. In addition, although flow diagram 300 relates to a chat session, any other type of sessions (e.g., image generation sessions, video generation sessions, or multi-modal sessions) can be processed in a similar manner.

Figure 4:
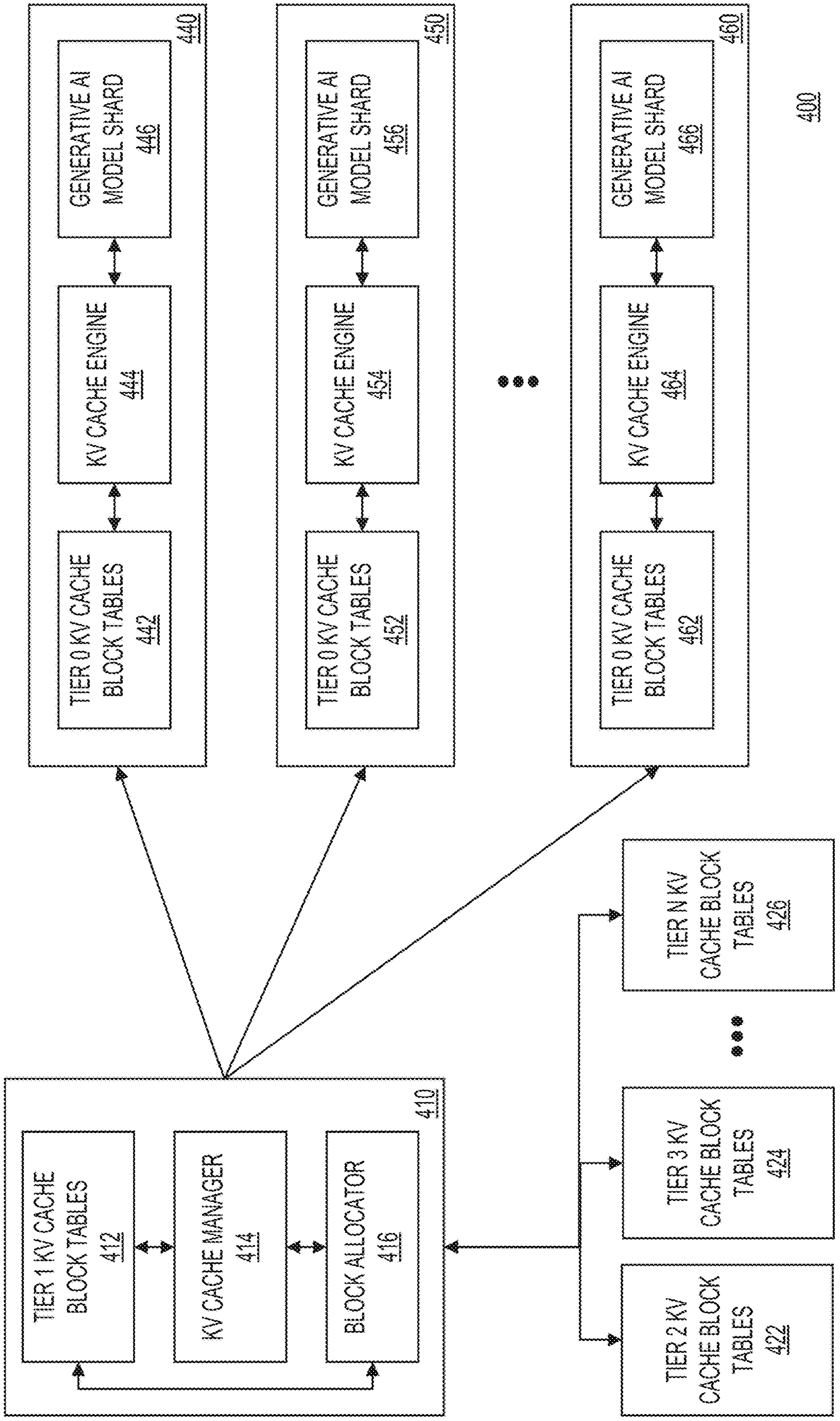
FIG. 4 shows a block diagram of a system for implementing multi-tier KV caching in accordance with one example.

FIG. 4 shows a block diagram of a system 400 for implementing multi-tier KV caching in accordance with one example. System 400 includes a KV cache management system 410, coupled with multi-tier memory KV cache blocks, which is further coupled with different workers for execution of portions (e.g., shards) of the generative AI model. KV cache management system 410 includes TIER 1 KV cache block tables 412, a KV cache manager 414, and a block allocator 416. KV cache manager 414 manages the KV cache in a block manner, such that KV cache is allocated by block allocator 416 in units of blocks (block size can be the same as the page size in a compute system). KV cache manager 414 is configured to manage the KV cache using various addressing strategies, including fast address translation using translation lookaside buffers or other addressing techniques. Block allocator 416 manages the KV cache blocks stored as part of the host memory (e.g., the RAM associated with the CPU). TIER-1 KV cache block tables 412 include the mapping information concerning translation of the logical blocks into physical blocks. System 400 further includes TIER 2 KV cache block tables 422, TIER 3 KV cache block tables 424, and TIER N KV cache block tables 426. System 400 can include fewer KV cache block tables or more KV cache block tables depending upon the number of memory tiers used for multi-tier KV caching. Additional details regarding the various tables, including KV cache block tables, are provided with respect to FIGS. 5-8.

With continued reference to FIG. 4, system 400 further includes workers 440, 450, and 460 for execution of portions (e.g., model shards) of the generative AI model. Worker 440 includes a KV cache engine 444 that can access TIER 0 KV cache block tables 442 for execution of the same set of input tokens as the other workers or different input tokens. As part of worker 440, generative AI model shard 446 can process these tokens. Worker 450 includes a KV cache engine 454 that can access TIER 0 KV cache block tables 452 for execution of the same set of input tokens as the other workers or different input tokens. As part of worker 450, generative AI model shard 456 can process these tokens. Worker 460 includes a KV cache engine 464 that can access TIER 0 KV cache block tables 462 for execution of the same set of input tokens as the other workers or different input tokens. As part of worker 460, generative AI model shard 466 can process these tokens. In one example, the host system for the generative AI model may be a CPU-host based system that coordinates the execution of the model using hardware AI accelerators, which could be GPU-based. Although FIG. 4 shows system 400 for implementing multi-tier KV caching as having certain components that are arranged in a certain manner, system 400 may include additional or fewer components, arranged differently. As an example, if the model shards are executing in parallel such that they are processing the same input tokens, then they can access the same TIER 0 KV cache block tables, rather than having different tables. Moreover, the number of tiers of memory can be selected based on the type of the generative AI model and whether the model will be served using an edge device (e.g., a laptop or another type of computer associated with a user) or using a hosted-solution (e.g., servers in a data center).

Figure 5:
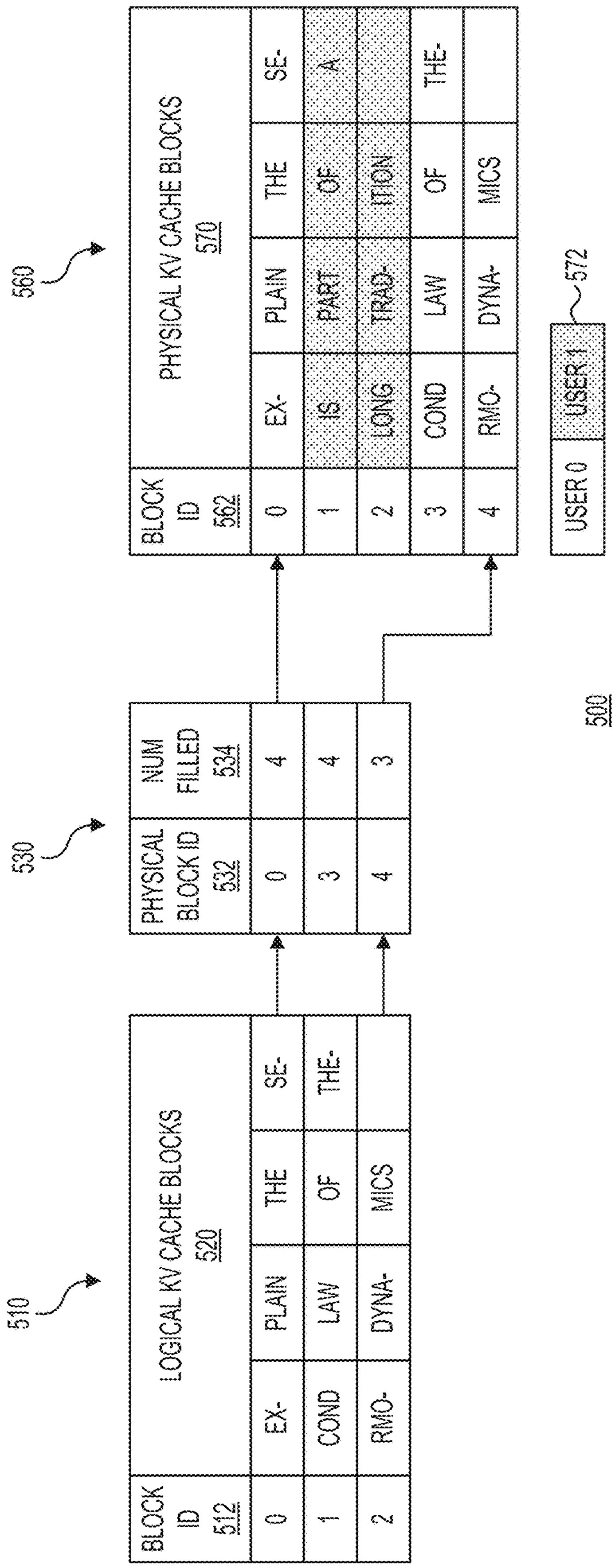
FIG. 5 shows a diagram of logical to physical memory translation via block tables in accordance with one example.

FIG. 5 shows a diagram 500 of logical to physical memory translation via block tables in accordance with one example. A KV cache associated with a user/session is represented as a series of logical KV cache blocks, filled from left to right as new tokens and corresponding KV cache entries are generated. Diagram 500 shows an example table 510 that includes the logical KV cache blocks 520 indexed by block IDs 512. The last KV block's unfilled positions can be reserved for future generations of KV cache entries. A cache engine (e.g., any of KV cache engines 444, 454, and 464 of FIG. 4) associated with a worker (e.g., any of worker 440, 450, and 460 of FIG. 4) allocates a contiguous chunk of the worker's memory and divides it into physical KV blocks. Table 560 shows an example that shows physical KV cache blocks 570, which are also indexed by block IDs 562 corresponding to the logical KV cache blocks shown in table 510. Table 530 includes the number of entries that are filled (NUM FILLE D 534) indexed by block IDs 532.

Having access to these tables allows the KV cache manager (e.g., KV cache manager 414 of FIG. 4) to maintain a mapping between the logical and physical KV blocks associated with each request corresponding to a particular session and for a particular user. As an example, as shown via legend 572 in FIG. 5, as part of table 560, the dotted physical KV cache blocks correspond to USER 1 and the other physical KV cache blocks relate to USER 0. Moreover, by having a separation between the logical and physical KV blocks, the KV cache memory can be dynamically grown. In one example, the block tables shown in FIG. 5 can correspond to TIER 1 KV cache block tables 412 of FIG. 4 and TIER 0 KV cache block tables 442, 452, and 462 of FIG. 4. Any of the tables described as part of diagram 500 of FIG. 5 may be implemented using data structures, such as dictionaries and hash tables. As used herein the term "table" includes any such data structure (compiled or implemented in hardware) for use with the KV cache. Although FIG. 5 shows tables with a certain arrangement and structure, tables shown as part of diagram 500 can have a different arrangement and structure.

Figure 6:
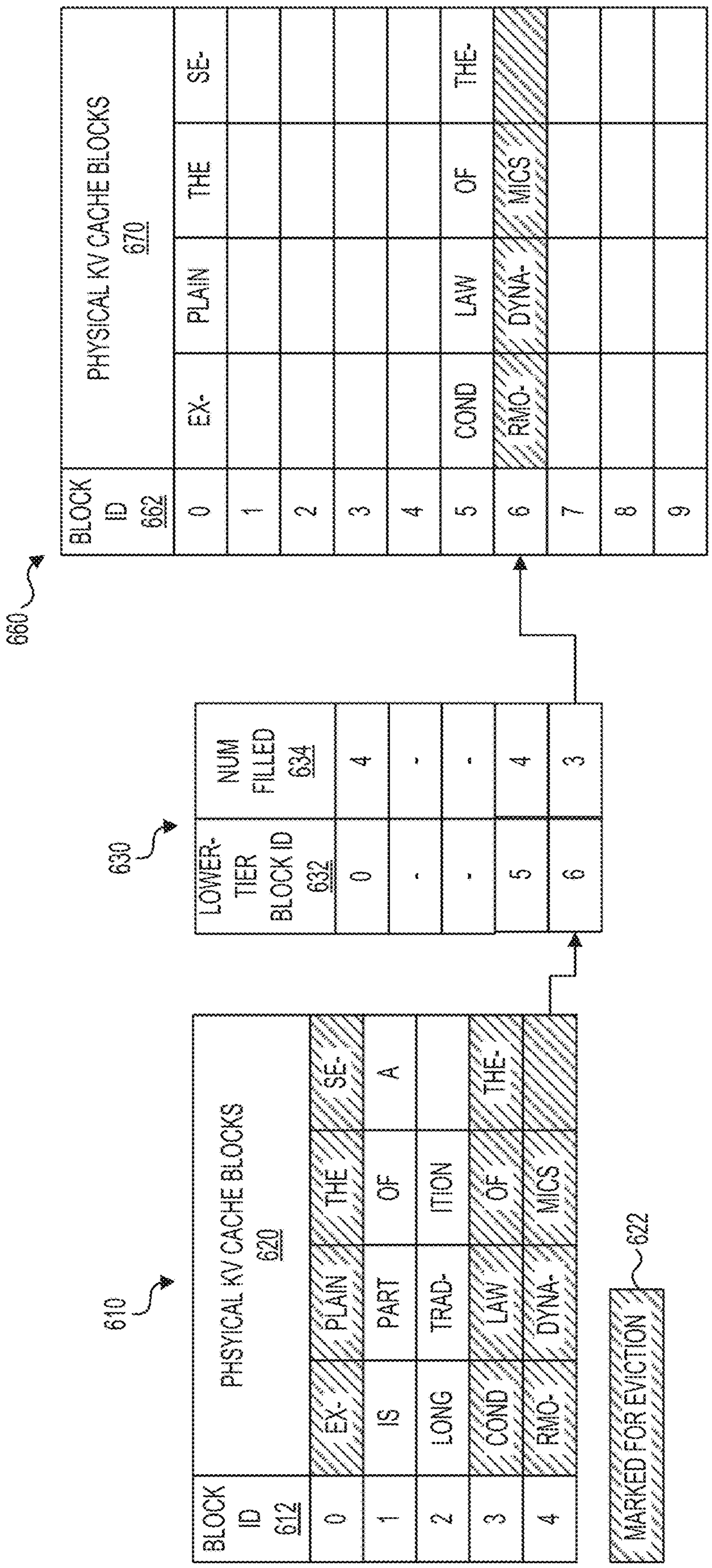
FIG. 6 shows a diagram of block tables associated with the KV cache eviction process in accordance with one example.

FIG. 6 shows a diagram 600 of block tables associated with the KV cache eviction process in accordance with one example. Diagram 600 shows an example table 610 that includes the physical KV cache blocks 620 indexed by block IDs 612. Table 610 represents a view of the physical KV cache blocks associated with a higher tier memory. Table 660 includes the physical KV cache blocks 670 indexed by block IDs 662. Table 660 represents a view of the physical KV cache blocks associated with a lower tier memory. Table 630 includes the number of entries that are filled (NUM FILLED 634) indexed by block IDs 632. Having access to these tables allows the KV cache manager (e.g., KV cache manager 414 of FIG. 4) to evict KV cache blocks from a lower tier memory and off-load them to a higher tier memory. Any suitable eviction algorithm, including the least recently used (LRU) or the least frequently used (LFU) can be deployed for selecting which KV cache to evict from the lower tier memory. As an example, as shown via legend 622 in FIG. 6, as part of table 610, certain KV cache blocks in the lower tier memory having block IDs 0, 3, and 4 are marked for eviction. As part of the eviction process, the KV cache manager (e.g., KV cache manager 414 of FIG. 4) checks table 660 to determine whether any of the physical KV cache blocks 620 marked for eviction (e.g., blocks with block IDs 0, 3, and 4) from the lower tier memory already exist in the higher tier memory. Thus, in the example tables 610 and 660 of FIG. 6, the KV cache manager determines that the physical KV cache blocks with block ID 0 and block ID 3 already exist in the higher tier memory, and only the missing block with the block ID 4 needs actual copying. Advantageously, copying only the missing blocks to the higher tier memory saves bandwidth. Any of the tables described as part of diagram 600 of FIG. 6 may be implemented using data structures, such as dictionaries and hash tables. As used herein the term "table" includes any such data structure (compiled or implemented in hardware) for use with the KV cache. Although FIG. 6 shows tables with a certain arrangement and structure, tables shown as part of diagram 600 can have a different arrangement and structure.

Figure 7:
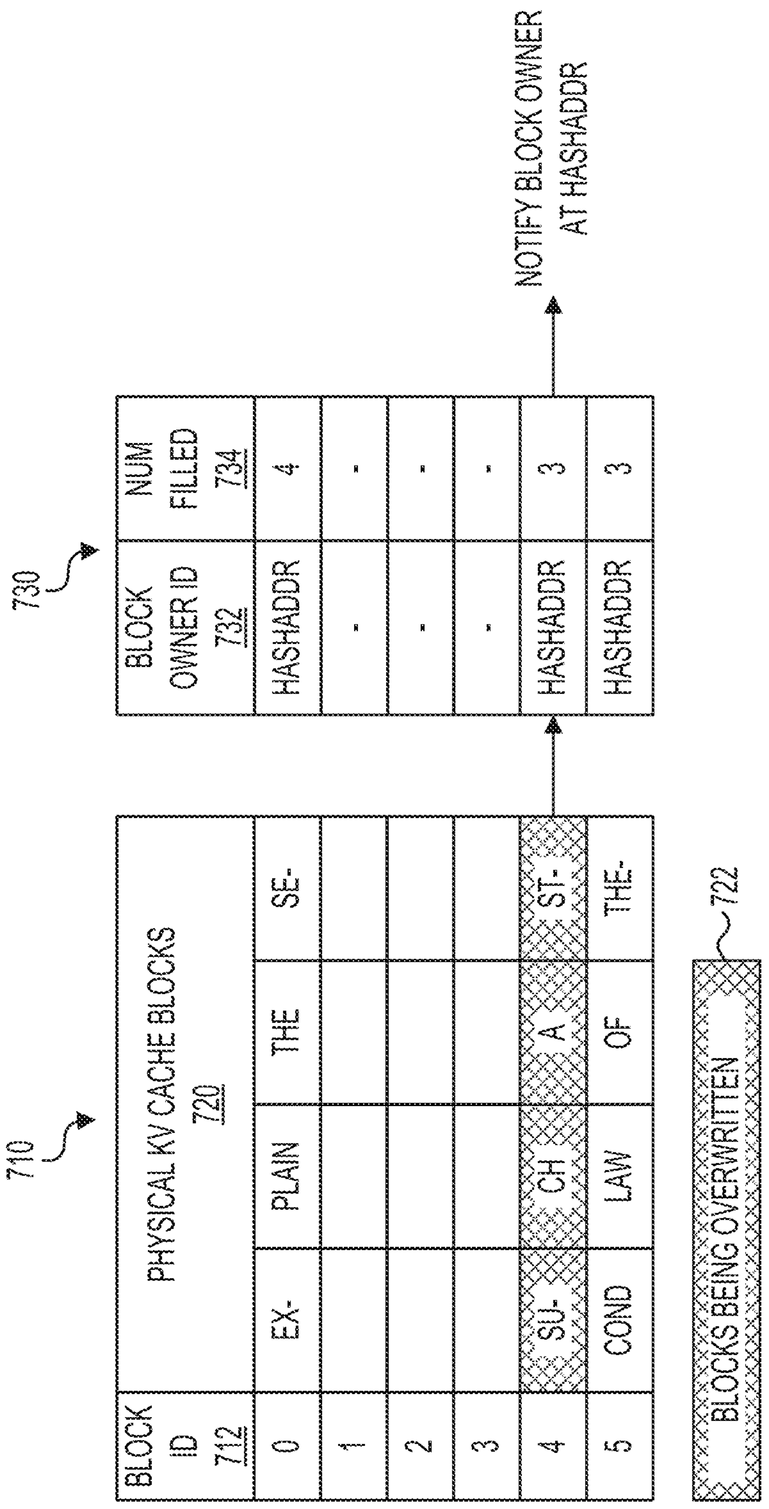
FIG. 7 shows a diagram of block tables associated with the KV cache off-loading process in accordance with one example.

FIG. 7 shows a diagram 700 of block tables associated with the KV cache off-loading process in accordance with one example. Diagram 700 shows an example table 710 that includes the physical KV cache blocks 720 indexed by block IDs 712. Table 710 represents a view of the physical KV cache blocks associated with a lower tier memory. Table 730 includes the number of entries that are filled (NUM FILLE D 734) indexed by the block owner's IDs 732 expressed in terms of the hash addresses in this example table. Hash addresses could be a combination of an owner (or user/session) identifier and the location of the higher tier memory to which the KV cache block belongs to. Having access to these tables allows the KV cache manager (e.g., KV cache manager 414 of FIG. 4) to ensure that if any KV cache blocks being loaded from a higher tier memory to a lower tier memory result in blocks being overwritten, the block ID entry owner is notified such that their memory-tier block table is updated with the new block owner ID. As an example, as shown via legend 722 in FIG. 7, as part of table 670, certain KV cache blocks in the lower tier memory having block ID 4 is being overwritten. The hash address in table 730 for that block owner ID is used as an index to ensure that the corresponding block owner is notified. Any of the tables described as part of diagram 700 of FIG. 7 may be implemented using data structures, such as dictionaries and hash tables. As used herein the term "table" includes any such data structure (compiled or implemented in hardware) for use with the KV cache. Although FIG. 7 shows tables with a certain arrangement and structure, tables shown as part of diagram 700 can have a different arrangement and structure.

Figure 8:
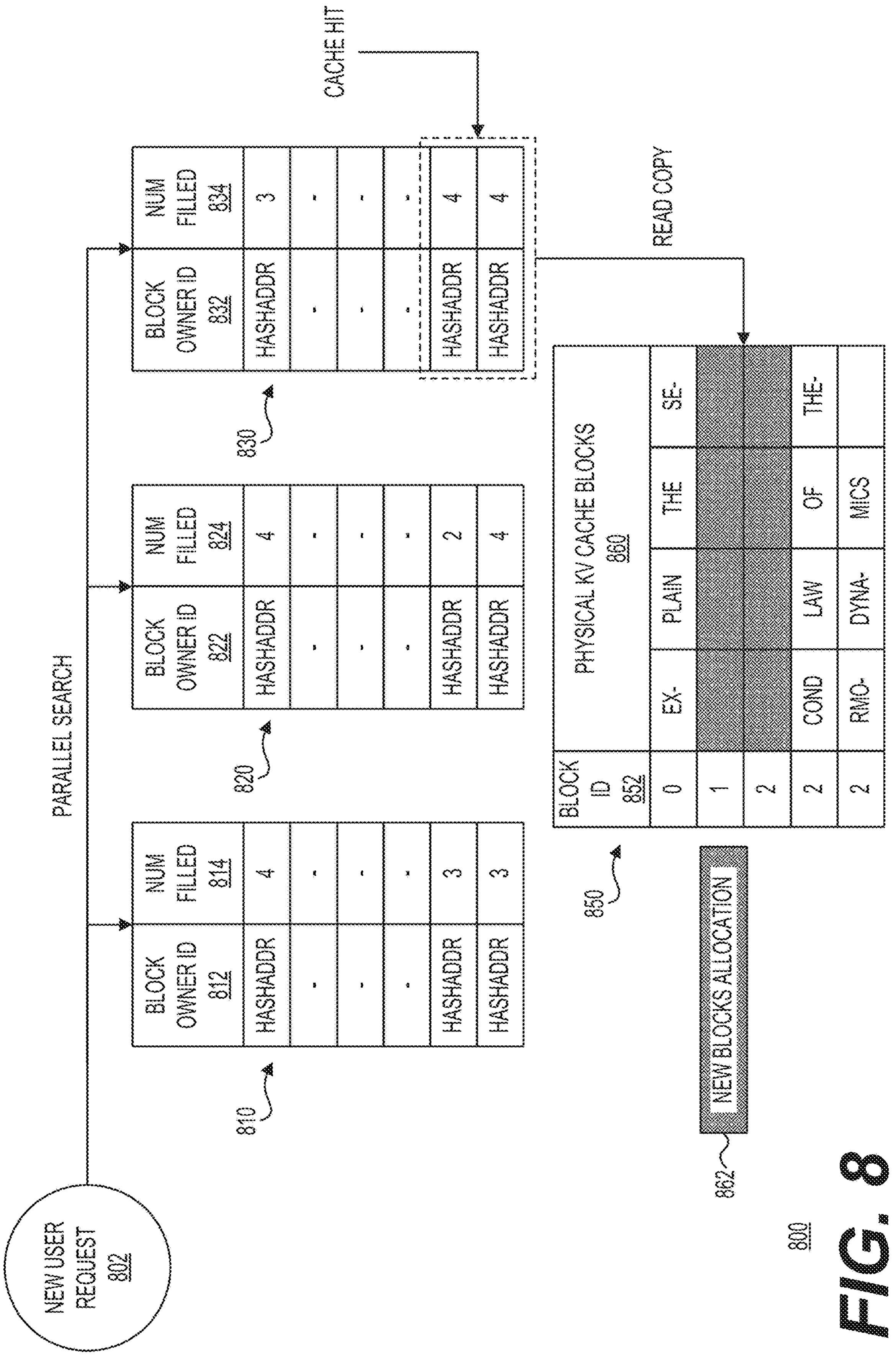
FIG. 8 shows a diagram of block tables associated with the KV cache loading process, including a parallel search of different memory tiers, in accordance with one example.

FIG. 8 shows a diagram 800 of block tables associated with the KV cache loading process, including a parallel search of different memory tiers, in accordance with one example. Diagram 800 shows tables (for different tiers of memory associated with the generative AI model) that are searched in parallel in response to a new user request 802. Table 810, which relates to a lower tier memory (e.g., TIER 0 memory), includes the number of entries that are filled (NUM FILLED 814) indexed by the block owner's IDs 812 expressed in terms of the hash addresses in this example table. Table 820, which relates to a next higher tier memory (e.g., TIER 1 memory), includes the number of entries that are filled (NUM FILLED 824) indexed by the block owner's IDs 822 expressed in terms of the hash addresses in this example table. Table 830, which relates to a next higher tier memory (e.g., TIER 0 memory), includes the number of entries that are filled (NUM FILLED 834) indexed by the block owner's IDs 832 expressed in terms of the hash addresses in this example table. Table 850 includes the physical KV cache blocks 860 indexed by block IDs 852. Table 850 represents a view of the physical KV cache blocks associated with the lowest tier memory (e.g., the local HBM associated with an AI accelerator) associated with the generative AI model.

During KV cache loading, the KV cache manager can perform a parallel search to find KV cache for the user request. Assuming there is a cache hit (e.g., with respect to block owner IDs in table 830), then new blocks are allocated in the lowest tier memory as identified by legend 862 in diagram 800. Once the KV cache is loaded into the lowest tier memory, additional processing can be performed without having to regenerate the key vectors, value vectors, and tokens for the user request, saving a substantial amount of time to the first new token. Any of the block tables described as part of diagram 800 of FIG. 8 may be implemented using data structures, such as dictionaries and hash tables. As used herein the term "table" includes any such data structure (compiled or implemented in hardware) for use with the KV cache. Although FIG. 8 shows tables with a certain arrangement and structure, tables shown as part of diagram 800 can have a different arrangement and structure.

Figure 9:
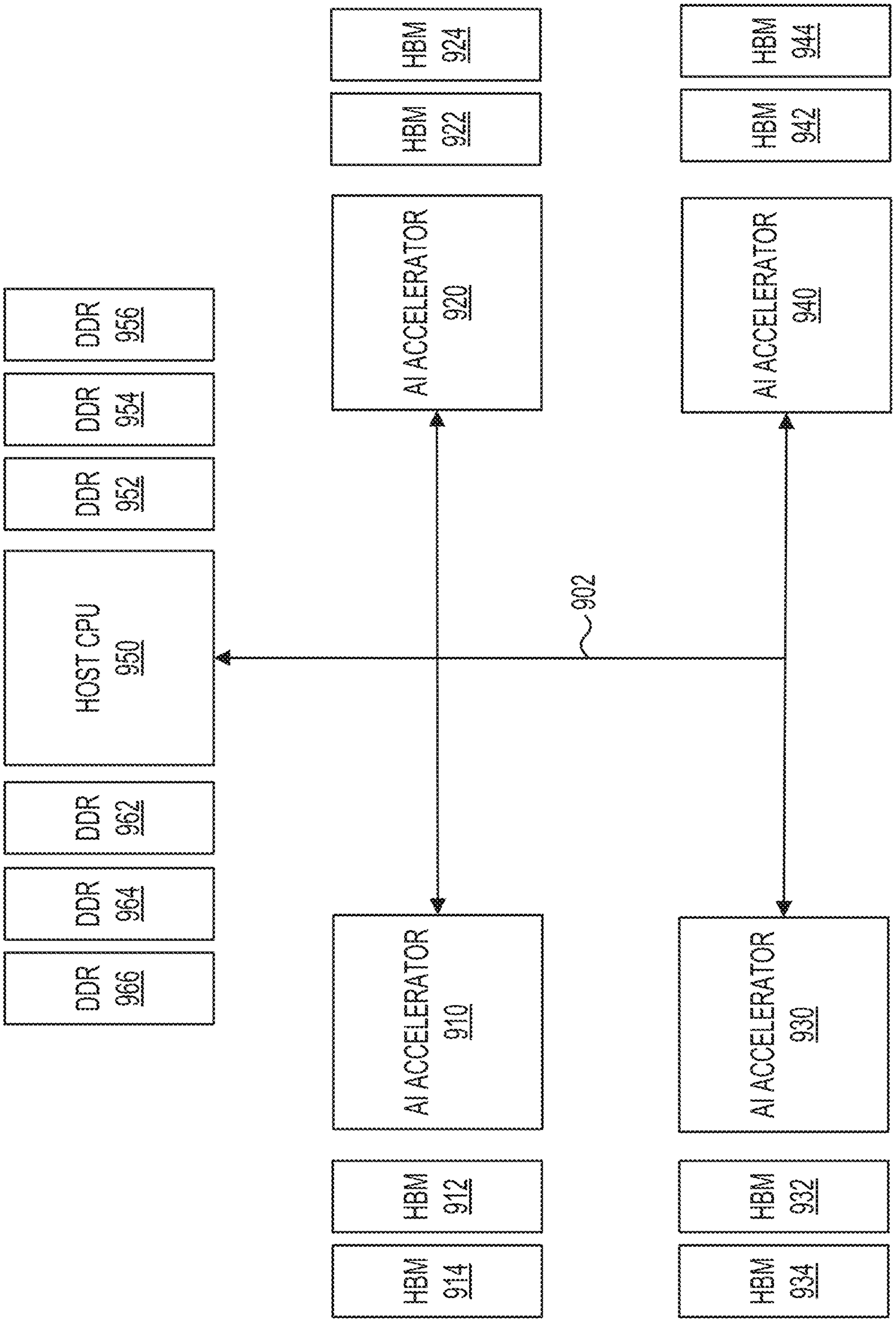
FIG. 9 shows an example system including two-tiers of memory for implementing multi-tier KV caching for a generative AI model.

FIG. 9 shows an example system 900 including two-tiers of memory for implementing multi-tier KV caching for a generative AI model. System 900 includes four AI accelerators (910, 920, 930, and 940) coupled via a bus 902 (e.g., a PCIe bus) to a host CPU 950. In this example, each accelerator has access to co-located high-bandwidth memory (HBM). AI accelerator 910 can access KV cache stored in HBM 912 or HBM 914, each of which acts as the lowest tier memory for any model shard(s) being processed using AI accelerator 910. AI accelerator 920 can access KV cache stored in HBM 922 or HBM 924, each of which acts as the lowest tier memory for any model shard(s) being processed using AI accelerator 920. AI accelerator 930 can access KV cache stored in HBM 932 or HBM 934, each of which acts as the lowest tier memory for any model shard(s) being processed using AI accelerator 930. AI accelerator 940 can access KV cache stored in HBM 942 or HBM 944, each of which acts as the lowest tier memory for any model shard(s) being processed using AI accelerator 940. Host CPU 950 is coupled with double-data ram (DDR) memory modules 952, 954, 956, 962, 964, and 966, which act as a higher tier memory for KV cache off-loading. Thus, KV cache (e.g., any KV cache associated with an inactive user) can be evicted from any of the HBM memories and off-loaded onto any of the DDR memory modules. Although FIG. 9 shows system 900 as including a certain number of AI accelerators coupled with two tiers of memory, system 900 can include additional or fewer AI accelerators coupled with additional tiers of memory for managing KV caching.

Figure 10:
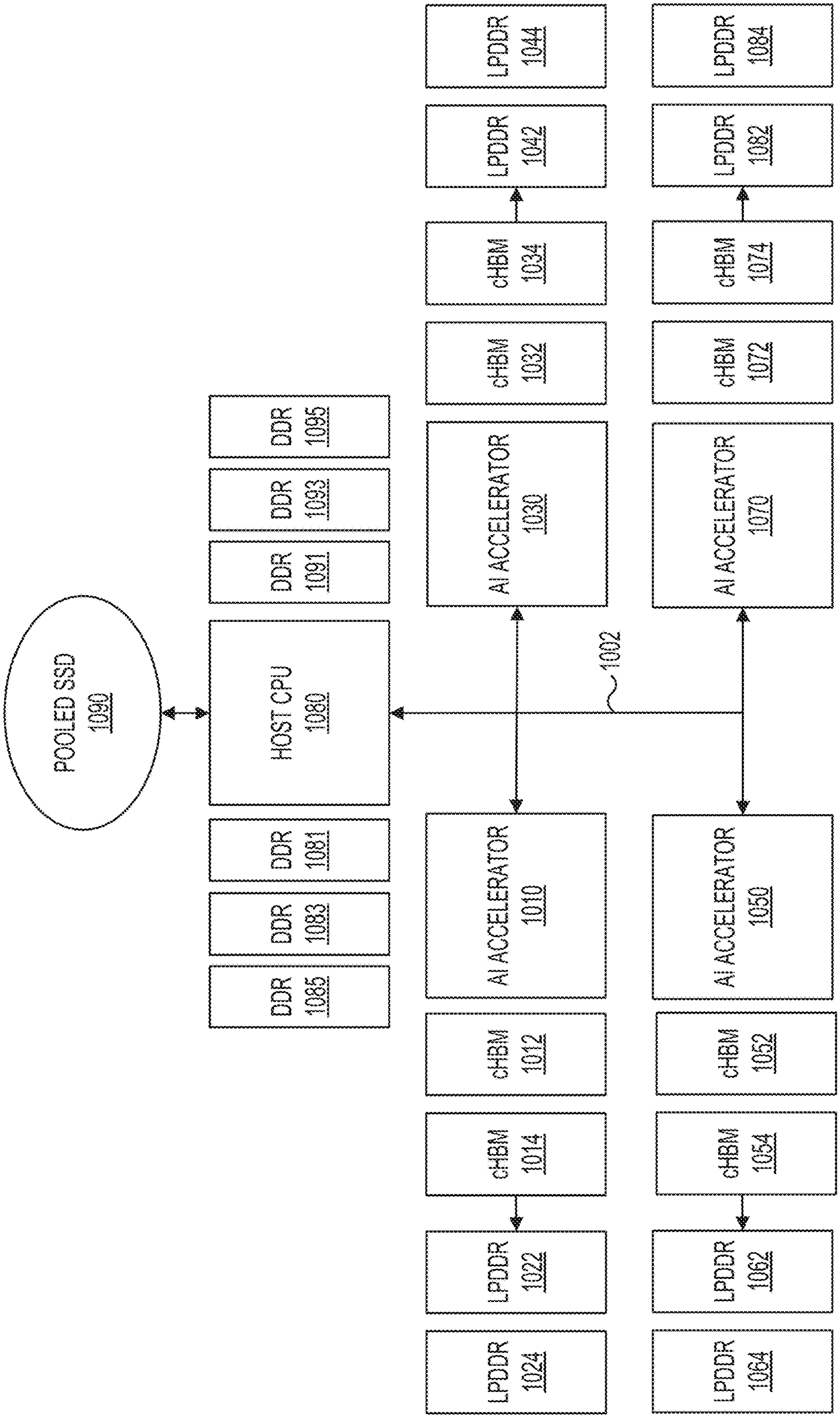
FIG. 10 shows an example system including four-tiers of memory for implementing multi-tier KV caching for a generative AI model.

FIG. 10 shows an example system 1000 including four-tiers of memory for implementing multi-tier KV caching for a generative AI model. System 1000 also includes four AI accelerators (1010, 1030, 1050, and 1070) coupled via a bus 1002 (e.g., a PCIe bus) to a host CPU 1080. In this example, each accelerator has access to co-located high-bandwidth memory (HBM). AI accelerator 1010 can access KV cache stored in custom HBM (cHBM) 1012 or cHBM 1014, each of which acts as the lowest tier memory for any model shard(s) being processed using AI accelerator 1010. AI accelerator 1030 can access KV cache stored in cHBM 1032 or cHBM 1034, each of which acts as the lowest tier memory for any model shard(s) being processed using AI accelerator 1030. AI accelerator 1050 can access KV cache stored in cHBM 1052 or cHBM 1054, each of which acts as the lowest tier memory for any model shard(s) being processed using AI accelerator 1050. AI accelerator 1070 can access KV cache stored in cHBM 1072 or cHBM 1074, each of which acts as the lowest tier memory for any model shard(s) being processed using AI accelerator 1040. AI accelerator 1010 is also coupled with low-power double-data rate (LPDDR) memory 1022 and LP DDR 1024, each of which acts as the next higher tier memory for AI accelerator 1010. AI accelerator 1030 is also coupled with LPDDR memory 1042 and LPDDR 1044, each of which acts as the next higher tier memory for AI accelerator 1030. AI accelerator 1050 is also coupled with LPDDR memory 1062 and LPDDR 1064, each of which acts as the next higher tier memory for AI accelerator 1050. AI accelerator 1070 is also coupled with LPDDR memory 1082 and LPDDR 1084, each of which acts as the next higher tier memory for AI accelerator 1070.

With continued reference to FIG. 10, host CPU 1080 is coupled with double-data ram (DDR) memory modules 1081, 1083, 1085, 1091, 1093, and 1095, which act as the next higher tier memory for KV cache off-loading. Thus, KV cache (e.g., any KV cache associated with an inactive user) can be evicted first from any of the cHBM memories and then off-loaded to any of the LP DDR memory, and then to any of the DDR memory modules. Host CPU 1080 is further coupled with a pooled solid-state device (SSD) memory 1090, which acts as the next higher tier memory. Thus, KV cache that needs to be evicted from any of the DDR memory modules can be off-loaded to the pooled SSD memory 1090. Although FIG. 10 shows system 1000 as including a certain number of AI accelerators coupled with two tiers of memory, system 1000 can include additional or fewer AI accelerators coupled with additional tiers of memory for managing KV caching.

Figure 11:
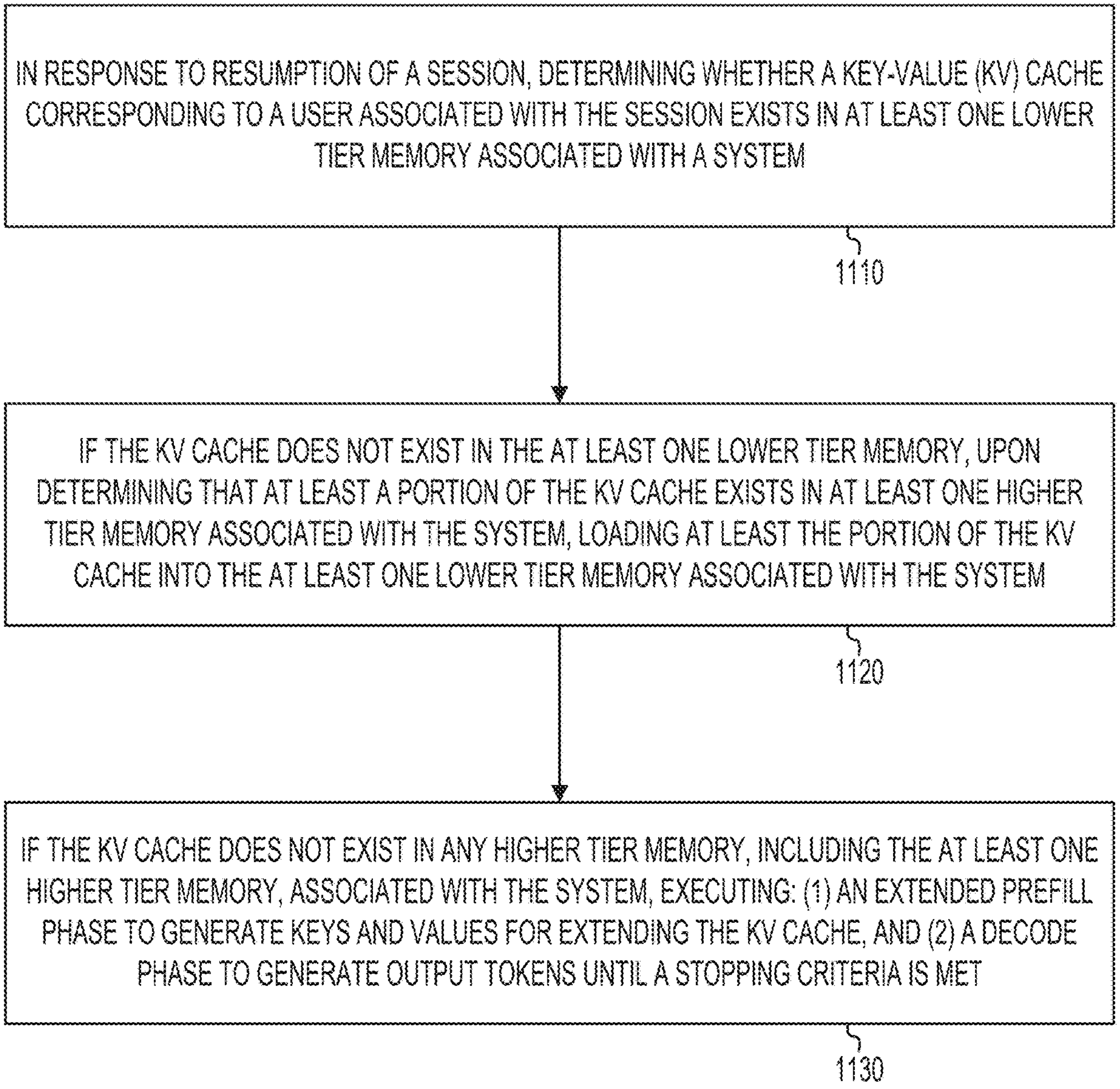
FIG. 11 shows a flow chart of a method for managing multi-tier KV caching for a generative AI model.

FIG. 11 shows a flow chart 1100 of a method for managing multi-tier KV caching for a generative AI model. Steps associated with this method can be performed in the context of system 100 of FIG. 1 and system 400 of FIG. 4. Moreover, system 900 of FIG. 9 and system 1000 of FIG. 10 provide specific examples of AI accelerators with multi-tier KV caching for serving at least a model shard (or the entire model) of the generative AI model. Step 1110 includes in response to resumption of a session, determining whether a key-value (KV) cache corresponding to a user associated with the session exists in at least one lower tier memory associated with the system. In this example, KV cache manager 414 of FIG. 4 can be configured to perform this step. As an example, as described with respect to FIGS. 3 and 4, KV cache manager 414 can determine as part of stage 304 of flow diagram 300 of FIG. 3 whether a complete KV cache exists in a lower tier memory associated with the system.

Step 1120 includes if the KV cache does not exist in the at least one lower tier memory, upon determining that at least a portion of the KV cache exists in at least one higher tier memory associated with the system, loading at least the portion of the KV cache into the at least one lower tier memory associated with the system. In this example, KV cache manager 414 of FIG. 4 can be configured to perform this step. As an example, as described with respect to FIGS. 3 and 4, KV cache manager 414 can determine as part of stage 306 of flow diagram 300 of FIG. 3 whether a complete/partial KV cache exists in a higher tier memory associated with the system. If it does, then as part of stage 308 of the flow shown in the flow diagram 300 of FIG. 3 the KV cache can be loaded into the lower tier memory.

Step 1130 includes if the KV cache does not exist in any higher tier memory, including the at least one higher tier memory, associated with the system, executing: (1) an extended prefill phase to generate keys and values for extending the KV cache, and (2) a decode phase to generate output tokens until a stopping criteria is met. In this example, any of KV cache engines 444, 454, or 464 of FIG. 4 can be configured to perform this step. As an example, as described with respect to FIGS. 3 and 4, the KV cache engine can perform these operations as part of the extended prefill phase 310 and decode phase 320 of flow diagram 300 of FIG. 3. As an example, the stopping criteria may include at least one of: (1) a maximum sequence length associated with the generative AI model, or (2) an end of sentence related to the session. Upon an indication of an end of sentence related to the session, after waiting for any user input for a predetermined amount of wait time, the KV cache can be off-loaded to a higher tier memory associated with the generative AI model. Although FIG. 11 describes a certain number of steps performed in a certain order, additional or fewer steps in a different order may be performed.

In conclusion, the present disclosure relates to a system for managing multi-tier key-value (KV) caching for a generative artificial intelligence (AI) model. The system may include at least one lower tier memory associated with the system. The system may further include at least one higher tier memory associated with the system. The system may further include a KV cache manager to: (1) in response to resumption of a session, determine whether a key-value (KV) cache corresponding to a user associated with the session exists in the at least one lower tier memory associated with the system, and (2) if the KV cache, or a portion thereof, does not exist in the at least one lower tier memory, upon determining that at least a portion of the KV cache exists in the at least one higher tier memory associated with the system, load at least the portion of the KV cache into the at least one lower tier memory.

The system may further include a KV cache manager to: (1) in response to resumption of a session, determine whether a key-value (KV) cache corresponding to a user associated with the session exists in the at least one lower tier memory associated with the system, and (2) if the KV cache does not exist in the at least one lower tier memory, upon determining that at least a portion of the KV cache exists in the at least one higher tier memory associated with the system, load at least the portion of the KV cache into the at least one lower tier memory.

The stopping criteria may comprise at least one of: (1) a maximum sequence length associated with the generative AI model, or (2) an end of sentence related to the session. The KV cache manager may further be configured to, upon an indication of an end of sentence related to the session, after waiting for any user input for a predetermined amount of wait time, off-load the KV cache to the at least one higher tier memory associated with the system.

The KV cache manager may further be configured to manage: (1) a first set of KV cache block tables associated with the at least one of the lower tier memory, and (2) a second set of KV cache block tables associated with the at least one of the higher tier memory. The KV cache manager may further be configured to, as part of off-loading the KV cache to the at least one higher tier memory associated with the system, update at least a subset of the first set of KV cache block tables and the second set of KV cache block tables.

The KV cache manager may further be configured to, as part of a loading process, load the KV cache from any one of the higher tier memory associated with the system into the at least one lower tier memory, perform a parallel search of all tables, indexed by hash entries generated based on respective KV cache block owner identifiers, associated with the system. The extended prefill phase may include a recompute of the KV cache, resulting in a longer time to a first new output token than otherwise.

In another example, the present disclosure relates to a method for managing multi-tier key-value (KV) caching for a generative artificial intelligence (AI) model served by a system. The method may include in response to resumption of a session, determining whether a key-value (KV) cache corresponding to a user associated with the session exists in at least one lower tier memory associated with the system. The method may further include, if the KV cache, or a portion thereof, does not exist in the at least one lower tier memory, upon determining that at least a portion of the KV cache exists in at least one higher tier memory associated with the system, loading at least the portion of the KV cache into the at least one lower tier memory associated with the system.

The method may further include, if the KV cache does not exist in any higher tier memory, including the at least one higher tier memory, associated with the system, executing: (1) an extended prefill phase to generate keys and values for extending the KV cache, and (2) a decode phase to generate output tokens until a stopping criteria is met.

The stopping criteria may comprise at least one of: (1) a maximum sequence length associated with the generative AI model, or (2) an end of sentence related to the session. The method may further comprise, upon an indication of an end of sentence related to the session, after waiting for any user input for a predetermined amount of wait time, off-loading the KV cache to any higher tier memory associated with the system.

The method may further comprise managing: (1) a first set of KV cache block tables associated with the at least one of the lower tier memory, and (2) a second set of KV cache block tables associated with the at least one of the higher tier memory. As part of off-loading the KV cache to the at least one higher tier memory associated with the system, the method may comprise updating at least a subset of the first set of KV cache block tables and the second set of KV cache block tables.

The method may further comprise, as part of a loading process to load the KV cache from any one of the higher tier memory associated with the system into the at least one lower tier memory, performing a parallel search of all tables, indexed by hash entries generated based on respective KV cache block owner identifiers, associated with the system. The method may further comprise recomputing the KV cache during the extended prefill phase, resulting in a longer time to a first new output token than otherwise.

In a yet another example, the present disclosure relates to a system for managing multi-tier key-value (KV) caching for a generative artificial intelligence (AI) model. The system may include at least one hardware accelerator. The system may further include a first tier memory associated with the at least one hardware accelerator. The system may further include a second tier memory associated with the at least one hardware accelerator. The system may further include a third tier memory associated with the at least one hardware accelerator.

The system may further include a KV cache manager to: (1) in response to resumption of a session, determine whether a key-value (KV) cache corresponding to a user associated with the session exists in the first tier memory associated with the at least one hardware accelerator, and (2) if the KV cache, or a portion thereof, does not exist in the first tier memory, upon determining whether at least a portion of the KV cache exists in at least one of the second tier memory or the third tier memory associated with the at least one hardware accelerator, load at least the portion of the KV cache into the first tier memory associated with the at least one hardware accelerator. The system may further include a KV cache engine to, if the KV cache does not exist in the first tier memory, the second tier memory, or the third tier memory, execute: (1) an extended prefill phase to generate keys and values for extending the KV cache in the at least one lower tier memory, and (2) a decode phase to generate output tokens until a stopping criteria is met.

The stopping criteria may comprise at least one of: (1) a maximum sequence length associated with the generative AI model, or (2) an end of sentence related to the session. The KV cache manager may be configured to, upon an indication of an end of sentence related to the session, after waiting for any user input for a predetermined amount of wait time, off-load the KV cache to at least one of the second tier memory or the third tier memory associated with the at least one hardware accelerator.

The KV cache manager may be configured to manage: (1) a first set of KV cache block tables associated with the first tier memory, (2) a second set of KV cache block tables associated with the second tier memory, and (3) a third set of KV cache block tables associated with the third tier memory. The KV cache manager may further be configured to, as part of off-loading the KV cache to the at least one of the second tier memory or the third tier memory associated with the at least one hardware accelerator, update at least a subset of the first set of KV cache block tables, the second set of KV cache block tables, or the third set of KV cache block tables. The KV cache manager may further be configured to perform a parallel search of all tables, indexed by hash entries generated based on respective KV cache block owner identifiers, associated with the at least one hardware accelerator.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, P RAM, or other such media, or networked versions of such media. Volatile media include, for example, dynamic memory, such as, DRAM, SRAM, a cache, or other such media. Non-transitory media is distinct from, but can be used in conjunction with, transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A system for managing multi-tier key-value (KV) caching for a generative artificial intelligence (AI) model, the system comprising:

at least one lower tier memory associated with the system;

at least one higher tier memory associated with the system;

a KV cache manager to: (1) in response to resumption of a session, determine whether a key-value (KV) cache corresponding to a user associated with the session exists in the at least one lower tier memory associated with the system, and (2) if the KV cache, or a portion thereof, does not exist in the at least one lower tier memory, upon determining that at least a portion of the KV cache exists in the at least one higher tier memory associated with the system, load at least the portion of the KV cache into the at least one lower tier memory; and a KV cache engine to, if the KV cache does not exist in any higher tier memory, including the at least one higher tier memory, associated with the system, execute: (1) an extended prefill phase to generate keys and values for extending the KV cache in the at least one lower tier memory, and (2) a decode phase to generate output tokens until a stopping criteria is met.

2. The system of claim 1, wherein the stopping criteria comprises at least one of: (1) a maximum sequence length associated with the generative AI model, or (2) an end of sentence related to the session.

3. The system of claim 1, wherein the KV cache manager is configured to, upon an indication of an end of sentence related to the session, after waiting for any user input for a predetermined amount of wait time, off-load the KV cache to the at least one higher tier memory associated with the system.

4. The system of claim 1, wherein the KV cache manager is further configured to manage: (1) a first set of KV cache block tables associated with the at least one of the lower tier memory, and (2) a second set of KV cache block tables associated with the at least one of the higher tier memory.

5. The system of claim 4, wherein the KV cache manager is further configured to, as part of off-loading the KV cache to the at least one higher tier memory associated with the system, update at least a subset of the first set of KV cache block tables and the second set of KV cache block tables.

6. The system of claim 1, wherein the KV cache manager is further configured to, as part of a loading process, load the KV cache from any one of the higher tier memory associated with the system into the at least one lower tier memory, perform a parallel search of all tables, indexed by hash entries generated based on respective KV cache block owner identifiers, associated with the system.

7. The system of claim 1, wherein the extended prefill phase includes recompute of the KV cache, resulting in a longer time to a first new output token than otherwise.

8. A method for managing multi-tier key-value (KV) caching for a generative artificial intelligence (AI) model served by a system, the method comprising:

in response to resumption of a session, determining whether a key-value (KV) cache corresponding to a user associated with the session exists in at least one lower tier memory associated with the system;

if the KV cache, or a portion thereof, does not exist in the at least one lower tier memory, upon determining that at least a portion of the KV cache exists in at least one higher tier memory associated with the system, loading at least the portion of the KV cache into the at least one lower tier memory associated with the system; and if the KV cache does not exist in any higher tier memory, including the at least one higher tier memory, associated with the system, executing: (1) an extended prefill phase to generate keys and values for extending the KV cache, and (2) a decode phase to generate output tokens until a stopping criteria is met.

9. The method of claim 8, wherein the stopping criteria comprises at least one of: (1) a maximum sequence length associated with the generative AI model, or (2) an end of sentence related to the session.

10. The method of claim 8, further comprising, upon an indication of an end of sentence related to the session, after waiting for any user input for a predetermined amount of wait time, off-loading the KV cache to any higher tier memory associated with the system.

11. The method of claim 8, further comprising managing: (1) a first set of KV cache block tables associated with the at least one of the lower tier memory, and (2) a second set of KV cache block tables associated with the at least one of the higher tier memory.

12. The method of claim 11, as part of off-loading the KV cache to the at least one higher tier memory associated with the system, updating at least a subset of the first set of KV cache block tables and the second set of KV cache block tables.

13. The method of claim 8, further comprising, as part of a loading process to load the KV cache from any one of the higher tier memory associated with the system into the at least one lower tier memory, performing a parallel search of all tables, indexed by hash entries generated based on respective KV cache block owner identifiers, associated with the system.

14. The method of claim 8, further comprising recomputing the KV cache during the extended prefill phase, resulting in a longer time to a first new output token than otherwise.

15. A system for managing multi-tier key-value (KV) caching for a generative artificial intelligence (AI) model, the system comprising:

at least one hardware accelerator;

a first tier memory associated with the at least one hardware accelerator;

a second tier memory associated with the at least one hardware accelerator;

a third tier memory associated with the at least one hardware accelerator;

a KV cache manager to: (1) in response to resumption of a session, determine whether a key-value (KV) cache corresponding to a user associated with the session exists in the first tier memory associated with the at least one hardware accelerator, and (2) if the KV cache, or a portion thereof, does not exist in the first tier memory, upon determining whether at least a portion of the KV cache exists in at least one of the second tier memory or the third tier memory associated with the at least one hardware accelerator, load at least the portion of the KV cache into the first tier memory associated with the at least one hardware accelerator; and a KV cache engine to, if the KV cache does not exist in the first tier memory, the second tier memory, or the third tier memory, execute: (1) an extended prefill phase to generate keys and values for extending the KV cache in the at least one lower tier memory, and (2) a decode phase to generate output tokens until a stopping criteria is met.

16. The system of claim 15, wherein the stopping criteria comprises at least one of: (1) a maximum sequence length associated with the generative AI model, or (2) an end of sentence related to the session.

17. The system of claim 15, wherein the KV cache manager is configured to, upon an indication of an end of sentence related to the session, after waiting for any user input for a predetermined amount of wait time, off-load the KV cache to at least one of the second tier memory or the third tier memory associated with the at least one hardware accelerator.

18. The system of claim 15, wherein the KV cache manager is configured to manage: (1) a first set of KV cache block tables associated with the first tier memory, (2) a second set of KV cache block tables associated with the second tier memory, and (3) a third set of KV cache block tables associated with the third tier memory.

19. The system of claim 18, wherein the KV cache manager is further configured to, as part of off-loading the KV cache to the at least one of the second tier memory or the third tier memory associated with the at least one hardware accelerator, update at least a subset of the first set of KV cache block tables, the second set of KV cache block tables, or the third set of KV cache block tables.

20. The system of claim 15, wherein the KV cache manager is further configured to perform a parallel search of all tables, indexed by hash entries generated based on respective KV cache block owner identifiers, associated with the at least one hardware accelerator.

* * * * *